(12) United States Patent
Kim et al.

(10) Patent No.: US 10,363,723 B2
(45) Date of Patent: Jul. 30, 2019

(54) FUNCTIONAL PACKAGING MATERIAL FOR MAINTAINING FRESHNESS HAVING IMPROVED ANTIMICROBIAL ACTIVITY AND METHOD FOR MAKING THE SAME

(71) Applicant: HANGREENTECH CO., LTD., Seoul (KR)

(72) Inventors: Dae Hyun Kim, Seoul (KR); Sung Kyun Park, Gyeonggi-do (KR); Tae Soo Suh, Seoul (KR); Wang Tak Lee, Seoul (KR)

(73) Assignee: HANGREENTECH CO., LTD., Seoul (KR)

( * ) Notice: Subject to any disclaimer, the term of this patent is extended or adjusted under 35 U.S.C. 154(b) by 6 days.

(21) Appl. No.: 15/699,097

(22) Filed: Sep. 8, 2017

(65) Prior Publication Data

US 2018/0065346 A1 Mar. 8, 2018

(30) Foreign Application Priority Data

Sep. 8, 2016 (KR) .................. 10-2016-0115644
Oct. 7, 2016 (KR) .................. 10-2016-0129867

(51) Int. Cl.
*B32B 27/18* (2006.01)
*B65D 65/40* (2006.01)
*B65D 81/24* (2006.01)

(52) U.S. Cl.
CPC .............. *B32B 27/18* (2013.01); *B65D 81/24* (2013.01); *B65D 65/40* (2013.01); *B65D 2565/388* (2013.01); *B65D 2575/00* (2013.01)

(58) Field of Classification Search
CPC ..................................................... B65D 81/24
See application file for complete search history.

(56) References Cited

FOREIGN PATENT DOCUMENTS

| JP | H10217381 | 8/1998 |
|---|---|---|
| KR | 100949531 | 3/2010 |
| KR | 20100121977 | 11/2010 |
| KR | 10120055050 | 5/2012 |
| KR | 20140042292 | 4/2014 |

*Primary Examiner* — Scott R. Walshon
*Assistant Examiner* — Elaine M Vazquez
(74) *Attorney, Agent, or Firm* — IPLA P.A.; James E. Bame

(57) ABSTRACT

A functional food packaging material and a method for making the same, where the food packaging material includes: a first film comprising synthetic resin, calcium carbonate powder coated with zinc oxide, boehmite powder coated with titanium dioxide, and hydroxyapatite powder coated with iron; a second film laminated on the first film and comprising powdery particles that contain synthetic resin, loess, elvan, kaolin, zeolite, feldspar, black mica, jade, selenium and charcoal; and a third film laminated on the second film and made of synthetic film. The first film has a higher porosity than that of the second film, and the second film has a higher porosity than that of the third film. The food packaging material has improved antimicrobial activity and maximizes food storage stability. The amount of functional powder added is minimized so that the formability of the packaging material is not adversely affected.

9 Claims, 7 Drawing Sheets

FUNCTIONAL PACKAGING MATERIAL FOR MAINTAINING FRESHNESS HAVING IMPROVED ANTIMICROBIAL ACTIVITY AND METHOD FOR MAKING THE SAME

CROSS REFERENCES

The present application claims priority to Korean Patent Application No. 10-2016-0129867, filed 7 Oct. 2016, which claims priority to Korean Patent Application No. 10-2016-0115614, filed 8 Sep. 2016, the entire contents of which is incorporated herein for all purposes by this reference.

BACKGROUND

The present invention relates to a functional food packaging material and a method for making the same, and more particularly to a synthetic resin-based food packaging material which includes calcium carbonate powder coated with zinc oxide, boehmite powder coated with titanium dioxide, hydroxyapatite ($Ca_{10}(PO_4)_6(OH)_2$) powder coated with iron, fine natural mineral powder, and charcoal powder particles, and thus has improved antimicrobial activity so as to improve the storage stability of food, and to a method for making the same.

With an increase in income levels and improvement in the living standard, national interest in food quality is increasing. Furthermore, as the consumption of environmentally friendly agricultural products and cold-stored meat increases rapidly, the need is increasing for functional packaging materials that are capable of maintaining the freshness of agricultural produces and preventing the oxidation of food during distribution in order to improve national health.

Technologies for preventing food spoilage include a functional packaging technology for maintaining freshness, which is embodied by blocking oxygen that causes changes in food quality, or adsorbing and decomposing the hormone ethylene that causes spoilage by accelerating the maturation of agricultural products or plants, or controlling the content of water that causes food deterioration, or adding antibacterial ad antifungal substances.

Methods for producing domestic and foreign food packaging materials aiming to increase the maintenance period of freshness of contents in the packaging materials are largely classified into two methods: an addition method in which a freshness-maintaining substance for controlling ethylene gas is added during manufacturing of packaging materials; and a perforation method in which fine holes are formed during manufacturing of packaging materials in order to adjust the amounts of carbon dioxide and oxide in the packaging materials to suitable levels.

Typical methods that are used in studies on functional packaging materials include methods of releasing or adsorbing specific gas to control the concentration of the gas or of adding antimicrobial substances, antioxidants or anti-fogging agents. In recent years, in addition to this functionality in the sense of food storage, the concept of consumer convenience, quality control and environmental protection has been introduced, and thus new packaging technologies, including an easy-to-peel package, a time-temperature indicator (TTI) that cumulatively indicates the time-temperature history, an oxygen indicator, and the like, have been developed mainly in advanced countries, and interest in packaging materials has increased.

Packaging materials including freshness-maintaining agents, developed in domestic and foreign countries, have been partially commercialized using charcoal or chitosan. However, these packaging materials, in fact, place emphasis on antimicrobial activity, and do not greatly differ from conventional products with respect to the effect of maintaining freshness, and thus are insufficient for commercialization in terms of maintenance of freshness. In particular, most packaging material products produced in Korea have been produced in small amounts by use of technologies developed in Japan and the like, rather than technologies developed in Korea.

In foreign countries, freshness-maintaining packaging technologies have been directly commercialized and are being marketed as products. Packaging materials produced by the addition method include Green Bag (USA) and Aisaika (Japan), and packaging materials produced by the perforation method include P-Plus (Japan) and Xtend (Stepac, Israel).

Green Bag (USA) and Aisaika have been imported and marketed in Korea, but the recognition thereof is not high due to their high costs and the like. P-Plus (Japan) has also been imported into Korea, but the sales volume thereof is not high due to the limitation of the perforation method and its high costs. Xtend is expected to be imported into Korea, but the use thereof for general purposes is limited due to the limitation of the perforation method.

In an attempt to solve such problems, Korean Patent No. 10-0949531 filed by the present inventors discloses a packaging material including powdery particles that contain natural mineral materials and charcoal. This packaging material is excellent in terms of food storage stability, but has a problem in that, because most of the powdery particles added are surrounded by synthetic resin, the powdery particles should be added in amounts larger than actually required. However, when the amount of powdery particles added increases, there are problems in that the formability of the packaging material is adversely affected and the transparency of the packaging material can be reduced.

In addition, in order to further improve the storage stability of food, an antioxidant function to prevent food oxidation (oxidative rancidity) needs to be enhanced. As used herein, the term "rancidity" refers to a phenomenon in which the oxidation of food by oxygen in air deteriorates the taste and color of the food and causes an off-flavor, thereby changing the appearance of the food. Rancidity deteriorates the quality of food, destroys the nutrients of food, and may cause oncogenes. Thus, in order to improve the storage stability of food, it is required to prevent rancidity by removing oxygen from the inside of food packaging materials to the highest possible extent. In the prior art, in order to remove oxygen from the inside of food packaging materials, a method was mainly used in which a deoxidizing agent or an oxygen-absorbing agent is prepared separately and placed in a packaging box or a packaging container. However, this method has problems in that it uses a complicated process and when it is applied to agricultural products, meat, fishes or shells, which have high water contents, the deoxidizing agent may flow out to contaminate the foods.

In the case of some foods, particularly meat and fish, the freshness of the foods is reduced by bacterial growth. In order to prevent this reduction in freshness, it is required to develop technology related to a functional packaging material having enhanced antimicrobial activity in addition to the effect of maintaining freshness.

SUMMARY OF THE INVENTION

The present invention has been made in order to solve the above-described problems, and it is an object of the present invention to provide a food packaging material in which functional particles are exposed through the pores of synthetic resin so that the amount of functional particles added can be reduced.

Another object of the present invention is to provide a food packaging material including calcium carbonate powder coated with zinc oxide, boehmite powder coated with titanium dioxide, and hydroxyapatite powder coated with iron, which have enhanced antimicrobial activity so as to eliminate the need for a separate deoxidizing agent.

Still another object of the present invention is to provide a method for making the food packaging material.

To achieve the above objects, the present invention provides a food packaging material including:

a first film including synthetic resin, calcium carbonate powder coated with zinc oxide, boehmite powder coated with titanium dioxide, and hydroxyapatite powder coated with iron;

a second film laminated on the first film including synthetic resin and powdery particles that contain synthetic resin, loess, elvan, kaolin, zeolite, feldspar, black mica, jade, selenium and charcoal; and a third film laminated on the second film and made of synthetic film, wherein the first film has a higher porosity than that of the second film, and the second film has a higher porosity than that of the third film.

The sum of the amounts of calcium carbonate powder coated with zinc oxide, the boehmite powder coated with titanium dioxide and the hydroxyapatite powder coated with iron, which are included in the first film, may be 0.1 to 0.5 parts by weight based on 100 parts by weight of the synthetic resin, and the powder particles may be included in the second film in an amount of 1 to 3 parts by weight based on 100 parts by weight of the synthetic resin.

The powder particles may contain 8 to 14 wt % of loess, 5 to 9 wt % of elvan, 14 to 18 wt % of kaolin, 20 to 24 wt % of zeolite, 2 to 5 wt % of feldspar, 12 to 16 wt % of black mica, 5 to 9 wt % of jade, 3 to 10 wt % of selenium, and 1 to 5 wt % of charcoal.

The present invention also provides a method for making a food packaging material, the method including the steps of:

(a) mixing natural mineral materials, including loess, elvan, kaolin, zeolite, feldspar, black mica, jade and selenium, with charcoal to obtain powdery particles;

(b) preparing calcium carbonate powder coated with zinc oxide;

(c) preparing boehmite powder coated with titanium dioxide;

(d) preparing hydroxyapatite powder coated with iron;

(e) mixing the powders, obtained in step (b), (c) and (d), with synthetic resin to obtain a first mixture, and introducing the first mixture into a film forming machine, followed by extrusion to obtain a first film;

(f) stretching the first film to obtain a first porous film;

(g) mixing the powdery particles, obtained in step (a), with synthetic resin to obtain a second mixture, and introducing the second mixture into a film forming machine, followed by extrusion to obtain a second film;

(h) stretching the second film to obtain a second porous film having a lower porosity than that of the first porous film;

(i) introducing synthetic resin into a film forming machine, followed by extrusion to obtain a third film; and (j) integrating the first porous film, the second porous film and the third film with one another by thermal pressing.

Step (b) may include the steps of:

(b1) adding calcium carbonate powder to distilled water, followed by stirring to obtain a calcium carbonate slurry;

(b2) dissolving a zinc salt in distilled water to obtain an aqueous solution, and adding the calcium carbonate slurry to the aqueous solution, followed by stirring at a pH of 4.8 to 5.0 and at a temperature of 80 to 95° C. to obtain a first reactant slurry; and (b3) filtering and washing the first reactant slurry to obtain a precipitate, drying the precipitate, and heat-treating the dried precipitate at a temperature of 350 to 450° C. for 20 to 40 minutes to obtain calcium carbonate powder particles coated with zinc oxide.

Step (c) may include the steps of:

(c1) adding boehmite to distilled water, followed by stirring to obtain a boehmite slurry;

(c2) dissolving a titanium salt in distilled water to obtain an aqueous solution, and adding the boehmite slurry to the aqueous solution, followed by stirring at a pH of 4.8 to 5.0 and at a temperature of 80 to 95° C. to obtain a second reactant slurry; and (c3) filtering and washing the second reactant slurry to obtain a precipitate, drying the precipitate, and heat-treating the dried precipitate at a temperature of 400 to 500° C. for 20 to 40 minutes to obtain boehmite powder particles coated with titanium dioxide.

Step (d) may include the steps of:

(d1) adding hydroxyapatite powder to distilled water, followed by stirring to obtain a hydroxyapatite slurry;

(d2) dissolving an iron salt in distilled water to obtain an aqueous solution, and adding the hydroxyapatite slurry to the aqueous solution, followed by stirring at a pH of 4.8 to 5.0 and at a temperature of 80 to 95° C. to obtain a third reactant slurry; and (d3) filtering and washing the third reactant slurry to obtain a precipitate, drying the precipitate, and heat-treating the dried precipitate at a temperature of 450 to 550° C. for 10 to 14 hours to obtain hydroxyapatite powder particles coated with iron.

DETAILED DESCRIPTION OF THE INVENTION

Hereinafter, preferred embodiments of the present invention will be described in further detail. These embodiments are provided so that this disclosure will be thorough and complete, and will fully convey the scope of the present invention to those skilled in the art. Thus, the present invention may be embodied in different forms and should not be construed as limited to the embodiments set forth herein.

Figure 1:
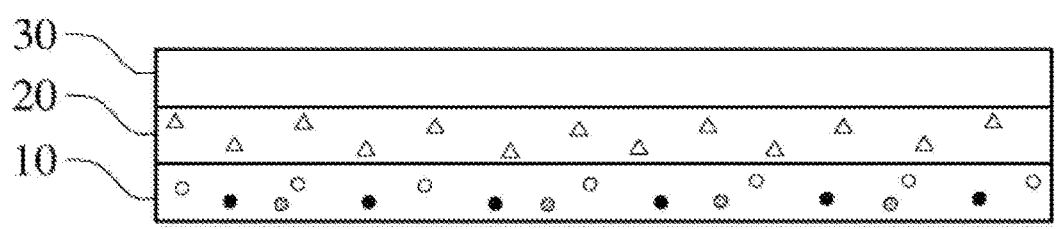
FIG. 1 is a cross-sectional view of a food packaging material according to an embodiment of the present invention.

As shown in FIG. 1, a food packaging material according to the present invention is composed of three films. A first film 10 is a porous film, and functions mainly to provide antioxidant activity and adsorb ethylene gas. A second film 20 is also a porous film, and functions mainly to provide antimicrobial activity and emit far-infrared rays. A third film 30 serves to protect the second film 20 from an external environment. The first film 10, the second film 20 and the third film 30 are sequentially laminated on one another, and the first film 10 comes in contact with food.

First Film

The first film is a porous film including synthetic resin, calcium carbonate powder coated with zinc oxide, boehmite powder coated with titanium dioxide, and hydroxyapatite powder coated with iron.

Examples of the synthetic resin that is used in the first film, include, but are not particularly limited to, polyethylene, polystyrene, polypropylene, polyvinyl chloride and the like.

Calcium carbonate powder coated with zinc oxide, boehmite powder coated with titanium dioxide, and hydroxyapatite powder coated with iron are added in order to enhance antioxidant activity and the function of adsorbing ethylene gas. Calcium carbonate powder and boehmite powder function as a skeletal structure that provides a large specific surface area. Hydroxyapatite powder is an almost perfect biocompatible material, and has been used mainly as a material for artificial teeth and bones in the medical field. In addition, hydroxyapatite powder has excellent adsorbent ability, and thus the range of application thereof has been expanded to a water purifier filter material that induces bacterial adsorption, and a photocatalyst material that removes sick house syndrome, etc. Hydroxyapatite also has antimicrobial activity and functions to adsorb toxic substances and emit far-infrared rays. Iron coated on the hydroxyapatite powder is converted into iron oxide by its reaction with oxygen in the food packaging material while it removes oxygen from the inside of the food packaging material to thereby prevent food rancidity.

Figure 2:
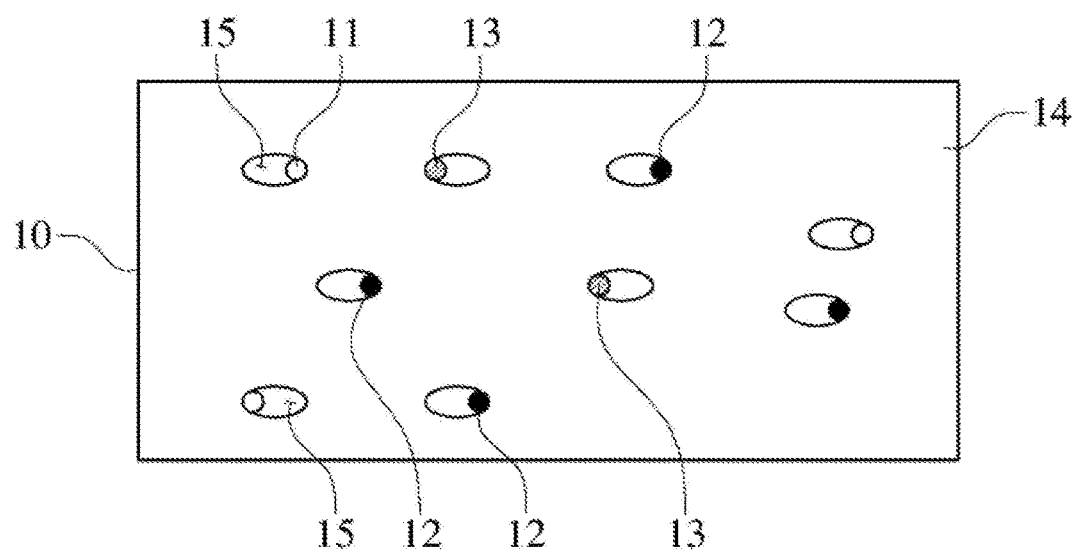
FIG. 2 is a front view of a first film in the food packaging material shown in FIG. 1.
Figure 3:
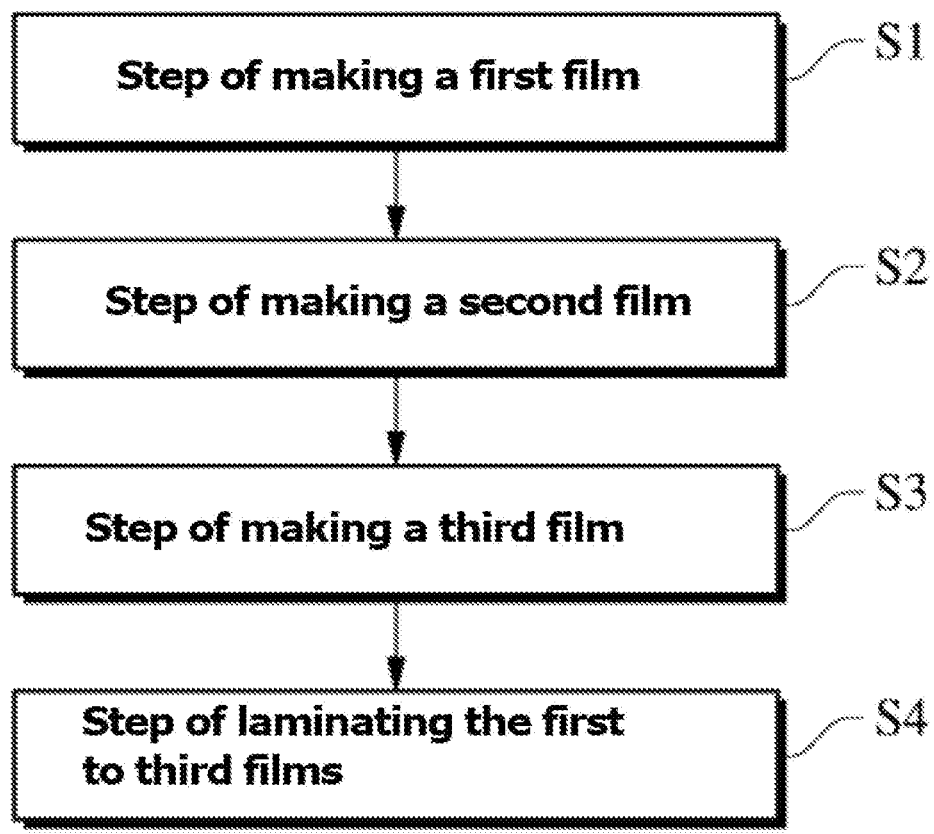
FIG. 3 is a flow diagram showing a method for making a food packaging material according to the present invention.

Furthermore, calcium carbonate powder coated with zinc oxide, boehmite powder coated with titanium dioxide, and hydroxyapatite powder coated with iron also serves to make the first film porous during stretching. Namely, when the first film is stretched, as shown in FIG. 2, the first film becomes porous while pores are formed at the interface between synthetic resin 14 and each of zinc oxide-coated calcium carbonate powder 11, titanium dioxide-coated boehmite powder 12 and iron-coated hydroxyapatite powder 13. Thus, the zinc oxide-coated calcium carbonate powder 11, the titanium dioxide-coated boehmite powder 12 and the iron-coated hydroxyapatite powder 13 are exposed around most of pores 15, and thus easily react with oxygen and ethylene gas in the packaging material.

The first film may be prepared by introducing zinc oxide-coated calcium carbonate powder, titanium dioxide-coated boehmite powder, iron-coated hydroxyapatite powder and synthetic resin into a film forming machine, extruding the introduced material to form a film, and stretching the formed film in at least one direction by use of a stretching machine. As the stretching machine, a known stretching machine such as a tenter stretching machine, an air inflation stretching machine or the like may be used. When the film is to be stretched in two directions, the film may be stretched sequentially in the machine direction and in the cross direction or may be stretched in the two directions at the same time. The stretching ratio is preferably 1.5 to 3.

The sum of the amounts of the calcium carbonate powder coated with zinc oxide, the boehmite powder coated with titanium dioxide and the hydroxyapatite powder coated with iron, which are included in the first film, is preferably 0.1 to 0.5 parts by weight based on 100 parts by weight of the synthetic resin, and the weight ratio between the calcium carbonate powder coated with zinc oxide and the boehmite powder coated with titanium dioxide is preferably 4:6 to 6:4. Furthermore, the weight ratio between the calcium carbonate powder coated with zinc oxide and the hydroxyapatite powder coated with iron is preferably 4:6 to 6:4. In such weight ratio ranges, the packaging material may exhibit optimal food storage stability while the formability of the packaging material is not impaired. In addition, the transparency of the packaging material may also be retained.

The calcium carbonate powder coated with zinc oxide may be prepared by the following impregnation method.

First, a zinc salt capable of dissolving in water to provide zinc ions in an aqueous solution, for example, zinc dichloride ($ZnCl_2$), is dissolved in distilled water to prepare an aqueous solution. Meanwhile, calcium carbonate powder is added to distilled water, and then sufficiently stirred to obtain a calcium carbonate slurry.

Next, the calcium carbonate slurry is added to the aqueous solution and stirred while adjusting the pH, thereby obtaining a first reactant slurry.

Thereafter, the first reactant slurry is filtered through a filter and washed with distilled water or alcohol, thereby obtaining a precipitate.

Then, the precipitate is dried, and heat-treated at a temperature, at which the zinc salt included in the dried precipitate is converted into zinc oxide and calcium carbonate is not decomposed, thereby obtaining calcium carbonate powder coated with zinc oxide.

The boehmite powder coated with titanium dioxide may also be prepared by a similar method.

First, a titanium salt that dissolves in water, for example, titanium dichloride ($TiCl_2$), is dissolved in distilled water to prepare an aqueous solution. Meanwhile, boehmite powder is added to distilled water, and then sufficiently stirred to obtain a boehmite slurry.

Next, the boehmite slurry is added to the aqueous solution and stirred while adjusting the pH, thereby obtaining a second reactant slurry.

Thereafter, the second reactant slurry is filtered through a filter and washed with distilled water or alcohol, thereby obtaining a precipitate.

Then, the precipitate is dried, and heat-treated at a temperature at which titanium is converted into titanium oxide, thereby obtaining boehmite powder coated with titanium oxide.

The hydroxyapatite powder coated with iron may also be prepared by a similar method.

First, an iron salt that dissolves in water is dissolved in distilled water to prepare an aqueous solution. Meanwhile, hydroxyapatite powder is added to distilled water, and then sufficiently stirred to obtain a hydroxyapatite slurry.

Next, the hydroxyapatite slurry is added to the aqueous solution and stirred while adjusting the pH, thereby obtaining a third reactant slurry.

Thereafter, the third reactant slurry is filtered through a filter and washed with distilled water or alcohol, thereby obtaining a precipitate.

Then, the precipitate is dried in vacuo, and heat-treated in a nitrogen atmosphere at a temperature at which the iron salt is converted into iron, thereby obtaining hydroxyapatite powder coated with iron. In order to prevent iron from being oxidized, the precipitate is dried in vacuo and heat-treated in a nitrogen atmosphere.

Second Film

The second film in the food packaging material according to the present invention includes synthetic resin, powdery particles that contain natural mineral materials, including loess, elvan, kaolin, zeolite, feldspar, black mica, jade, selenium and the like, and charcoal.

Examples of the synthetic resin that is used in the second film, include, but are not particularly limited to, polyethylene, polystyrene, polypropylene, polyvinyl chloride and the like. Preferably, polypropylene may be used as the synthetic resin.

The natural mineral materials include loess, elvan, kaolin, zeolite, feldspar, black mica, jade, and selenium, and may further include known natural mineral materials that do not impair the formability of the packaging material.

The powdery particles included in the food packaging material according to the present invention preferably contain, based on the total weight of natural mineral material and charcoal powder particles, 8 to 14 wt % of loess, 5 to 9 wt % of elvan, 14 to 18 wt % of kaolin, 20 to 24 wt % of zeolite, 2 to 5 wt % of feldspar, 12 to 16 wt % of black mica, 5 to 9 wt % of jade, 3 to 10 wt % of selenium, and 1 to 5 wt % of charcoal.

In the present invention, loess, elvan and jade are added in order to emit far-infrared rays, and zeolite and charcoal are added in order to provide antimicrobial activity and porous components. Kaolin and feldspar are added in order to maintain the elasticity and buffering properties of the packaging material during manufacturing at the same levels as those of conventional products, and black mica and selenium are added in order to provide antioxidant activity. The minimum content of each of the components is a value required to enable each component to exhibit its function in a state in which it is mixed with synthetic resin and formed into a packaging material. If the content of each component exceeds the maximum content, the formability of the packaging material becomes problematic.

Such natural mineral and charcoal in the form of fine powder function to emit large amounts of far-infrared rays and anions, adsorb toxic components such as ethylene or heavy metals, remove moisture, and exhibit antimicrobial activity and antioxidant activity, thereby improving food storage stability and human safety. Particularly, they can effectively capture ethylene gas which is released when foods such as fruits are oxidized and aged, thereby maintaining the freshness of the foods over a long period of time.

Furthermore, the powdery particles containing natural mineral materials and charcoal according to the present invention are included in the second film in an amount of 1 to 3 parts by weight based on 100 parts by weight of the synthetic resin. In this range, the packaging material may exhibit optimal food storage stability while the formability of the packaging material is not impaired. In addition, the transparency of the packaging material may also be retained.

Third Film

The third film may be prepared by introducing synthetic resin into a film forming machine and extruding the introduced synthetic resin. The first film, the second film and the third film may be integrated with one another by thermal pressing.

Hereinafter, the present invention will be described in further detail with reference to examples.

Example 1

In this Example, a synthetic resin-based packaging material was produced using synthetic resin, powdery particles containing natural mineral material and charcoal, calcium carbonate powder coated with zinc oxide, and boehmite powder coated with titanium dioxide.

The method for making the packaging material includes the steps of: (S1) making a first film; (S2) making a second film; (S3) making a third film; and (S4) laminating the first to third films. Hereinafter, each step will be described.

Making of First Film

Figure 4:
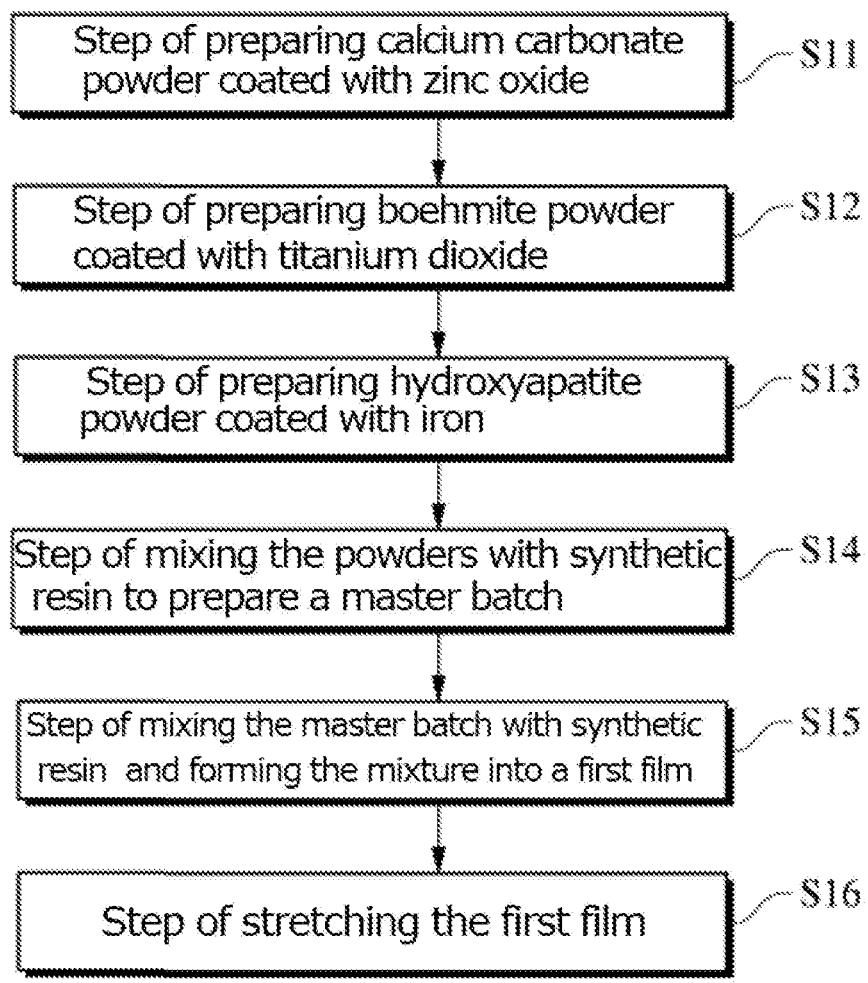
FIG. 4 is a flow diagram showing the step of making the first film shown in FIG. 3.

Step (S1) of making the first film will now be described with reference to FIG. 4.

The step of making the first film includes the steps of: (S11, S12, S13) preparing calcium carbonate powder coated with zinc oxide, boehmite powder coated with titanium dioxide, and hydroxyapatite coated with iron, respectively; (S14) mixing these powders with synthetic resin to prepare a master batch; (S15) mixing the master batch with synthetic resin, and forming the mixture into a first film; and (S16) stretching the first film.

Figure 5:
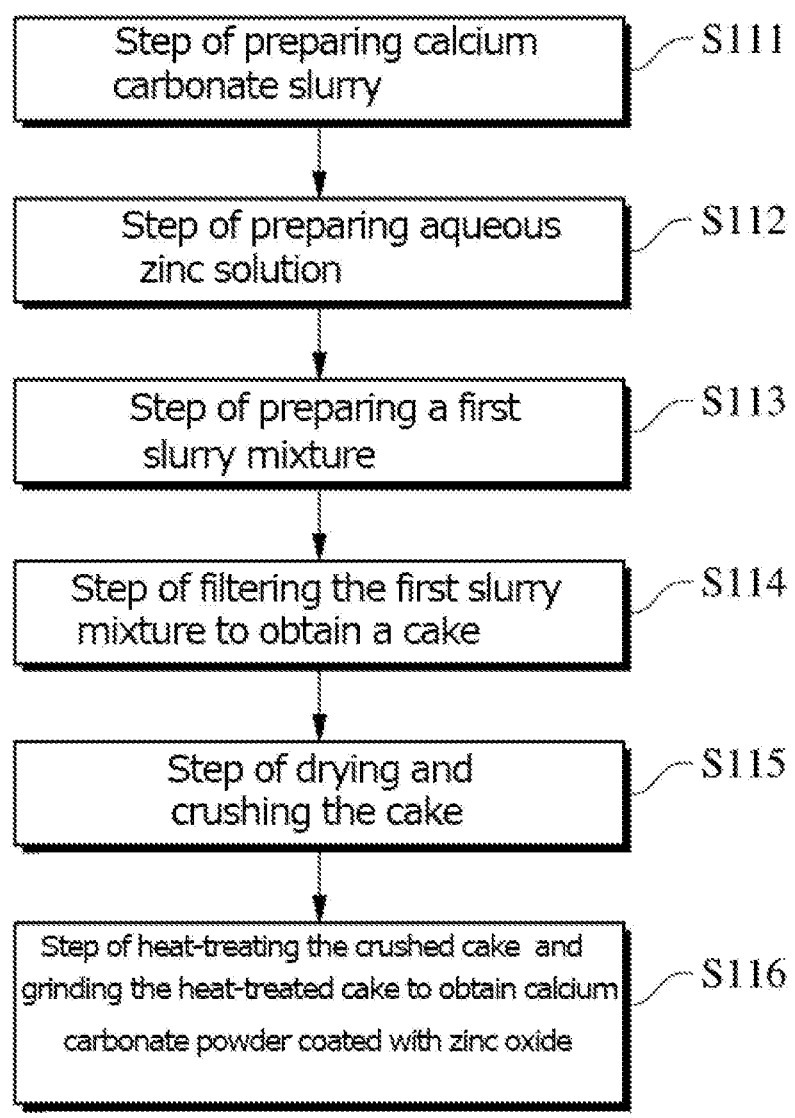
FIG. 5 is a flow diagram showing the step of preparing zinc oxide-coated calcium carbonate powder shown in FIG. 4.

Step (S11) of preparing calcium carbonate powder coated with zinc oxide will now be described with reference to FIG. 5. Calcium carbonate powder was mixed with distilled water at a volume ratio of 2:8, and the mixture was stirred at a speed of 250 to 350 rpm for 30 to 60 minutes, thereby obtaining a calcium carbonate slurry (S111).

Furthermore, zinc dichloride was dissolved in distilled water to obtain a 0.5M aqueous solution of zinc dichloride (S112).

Then, 800 g of the calcium carbonate slurry was mixed with 200 g of the aqueous solution, and then stirred at a pH of 4.8 to 5.0, a temperature of 80 to 95° C. and a speed of 400 to 700 rpm for 1 to 5 hours, thereby obtaining a first slurry mixture (S113).

Next, the first slurry mixture was filtered, diluted in distilled water, and then filtered. This operation was repeated 2 to 3 times, thereby obtaining a cake (S114).

The cake was dried at about 100° C. for about 15 hours, and then crushed (S115).

The crushed cake was heat-treated at a temperature of 350 to 450° C. for 20 to 40 minutes and ground to obtain calcium carbonate powder coated with zinc oxide (S116).

Figure 6:
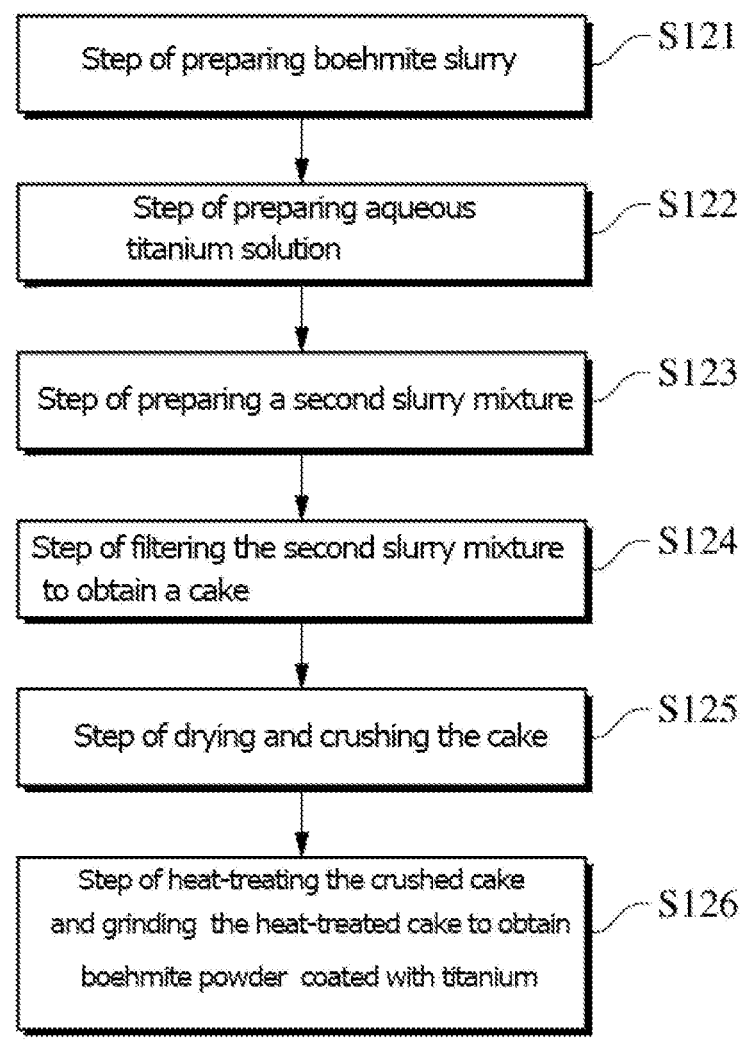
FIG. 6 is a flow diagram showing the step of preparing titanium dioxide-coated boehmite powder shown in FIG. 4.

Step (S12) of preparing boehmite powder coated with titanium dioxide will now be described with reference to FIG. 6.

Boehmite powder was mixed with distilled water at a volume ratio of 2:8, and the mixture was stirred at a speed of 250 to 350 rpm for 30 to 60 minutes, thereby obtaining a boehmite slurry (S121).

Furthermore, titanium dioxide was dissolved in distilled water to obtain a 0.5M aqueous solution of titanium dioxide (S122).

Then, 800 g of the boehmite slurry was mixed with 200 g of the aqueous solution, and then stirred at a pH of 4.8 to 5.0, a temperature of 80 to 95° C. and a speed of 400 to 700 rpm for 1 to 5 hours, thereby obtaining a second slurry mixture (S123).

Next, the second slurry mixture was filtered, diluted in distilled water, and then filtered. This operation was repeated 2 to 3 times, thereby obtaining a cake (S124).

The cake was dried at about 100° C. for about 15 hours, and then crushed (S125).

The crushed cake was heat-treated at a temperature of 400 to 500° C. for 20 to 40 minutes and ground to obtain boehmite powder coated with titanium dioxide (S126).

Figure 7:
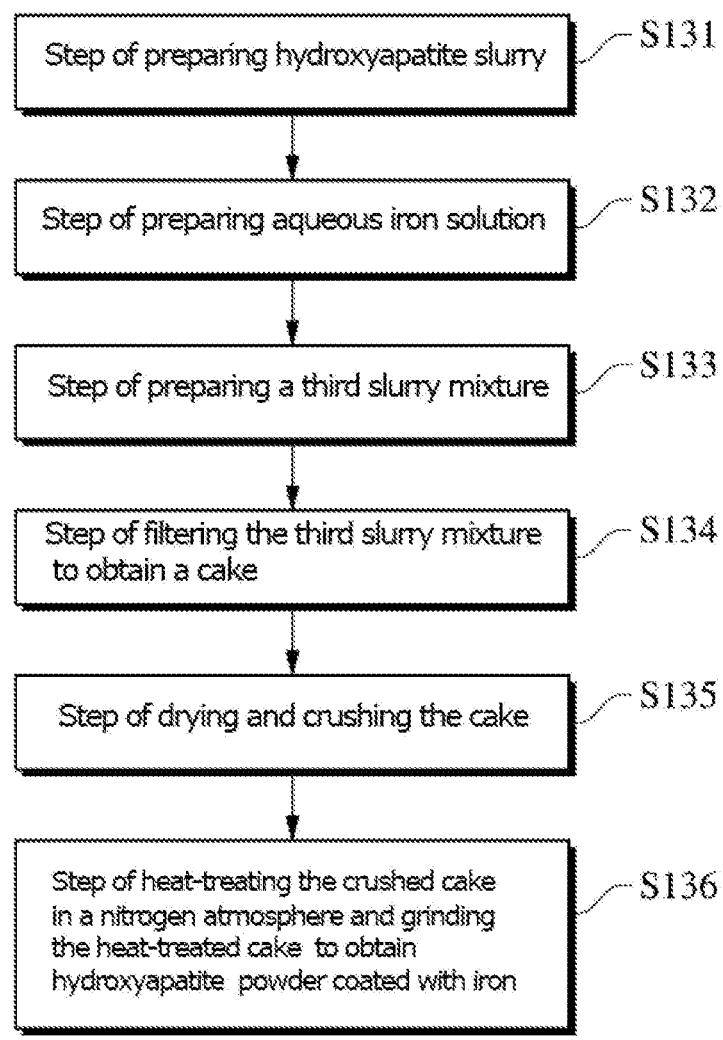
FIG. 7 is a flow diagram showing the step of preparing iron-coated hydroxyapatite powder shown in FIG. 4.
Figure 8:
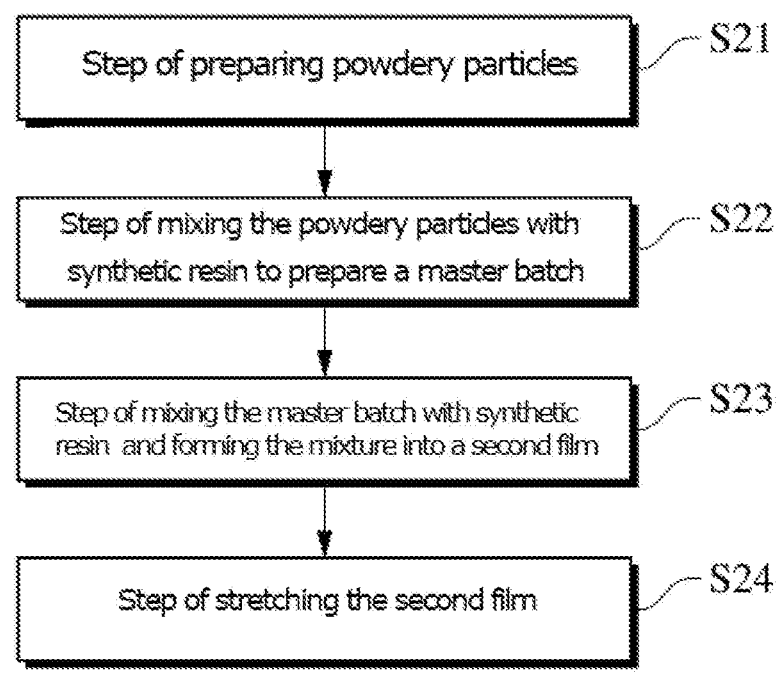
FIG. 8 is a flow diagram showing the step of making the second film shown in FIG. 3.

Step (S13) of preparing hydroxyapatite powder coated with iron will now be described with reference to FIG. 7.

Hydroxyapatite powder was mixed with distilled water at a volume ratio of 2:8, and the mixture was stirred at a speed of 250 to 350 rpm for 30 to 60 minutes, thereby obtaining a hydroxyapatite slurry (S131).

Furthermore, ferrous chloride dihydrate ($FeCl_2.2H_2O$) was dissolved in distilled water to obtain a 0.5M aqueous solution of ferrous chloride dihydrate (S132).

Then, 800 g of the boehmite slurry was mixed with 200 g of the aqueous solution, and then stirred at a pH of 4.8 to 5.0, a temperature of 80 to 95° C. and a speed of 400 to 700 rpm for 1 to 5 hours, thereby obtaining a second slurry mixture (S133).

Next, the third slurry mixture was filtered, diluted in distilled water, and then filtered. This operation was repeated 2 to 3 times, thereby obtaining a cake (S134).

The cake was dried at about 130° C. for about 6 hours, and then crushed (S135).

The crushed cake was heat-treated in a nitrogen atmosphere at a temperature of 450 to 550° C. for 10 to 14 minutes and ground to obtain hydroxyapatite powder coated with iron dioxide (S136).

Thereafter, the calcium carbonate powder coated with zinc oxide, the boehmite powder coated with titanium dioxide, and the hydroxyapatite powder coated with iron were mixed with the synthetic resin polypropylene, and the mixture was introduced into an extruder, thereby obtaining a pellet-type master batch (S14).

For uniform mixing of the zinc oxide-coated calcium carbonate powder, the titanium dioxide-coated boehmite powder, the iron-coated hydroxyapatite powder and polypropylene resin, a power mixer was used. A batch mixture of the zinc oxide-coated calcium carbonate powder, the titanium dioxide-coated boehmite powder, the iron-coated hydroxyapatite powder and polypropylene resin was introduced into an extruder.

The chamber temperature of the extruder was maintained at about 180° C., and the speed of the screw was adjusted such that the diameter of the master batch would be 2.5 mm to 3 mm, whereby the master batch could be stably prepared. When introducing the batch mixture of the zinc oxide-coated calcium carbonate powder, the titanium dioxide-coated boehmite powder, the iron-coated hydroxyapatite powder and polypropylene resin, a certain amount of a polypropylene-based dispersing agent was used to prevent agglomeration.

In the mixture of the zinc oxide-coated calcium carbonate powder, the titanium dioxide-coated boehmite powder, the iron-coated hydroxyapatite powder and polypropylene resin, the weight ratio between the zinc oxide-coated calcium carbonate powder, the titanium dioxide-coated boehmite powder and the iron-coated hydroxyapatite powder was 1:1:1, and the sum of the contents of the zinc oxide-coated calcium carbonate powder, the titanium dioxide-coated boehmite powder and the iron-coated hydroxyapatite powder was 25 wt % based on the total weight of the mixture.

Thereafter, the master batch was mixed with synthetic resin, and then formed into a first film (S15).

Specifically, the prepared master batch of the zinc oxide-coated calcium carbonate powder, the titanium dioxide-coated boehmite powder and the iron-coated hydroxyapatite powder was mixed with polypropylene resin in such a manner that 0.5 parts by weight of the zinc oxide-coated calcium carbonate powder, 0.5 parts by weight of the titanium dioxide-coated boehmite powder and 0.5 parts by weight of the iron-coated hydroxyapatite powder would be mixed with 100 parts by weight of polypropylene resin, and the mixture was introduced into a film forming machine and extruded, thereby making a first film.

Next, the first film was stretched 2-fold in one direction by use of a stretching machine, thereby making a first porous film (S16).

Making of Second Film

Hereinafter, step (S2) of making the second film will be described with reference to FIG. 7.

Step (S2) of making the second film includes the steps of: (S21) preparing powdery particles; (S22) mixing the particles with synthetic resin to prepare a master batch; and (S23) mixing the master batch with synthetic resin, and forming the mixture into a second film.

First, step (S21) of preparing powdery particles was performed in the following manner.

For addition to the second film, natural mineral materials, including loess, elvan, kaolin, zeolite, feldspar, black mica, jade, selenium and charcoal, were prepared.

Loess, elvan, kaolin, zeolite, feldspar, black mica, jade, selenium and charcoal were mixed at a weight ratio of 13:8:17:23:4:16:8:8:3 based on the total weight taken as 100, and the mixture was ground to a size of about 100 mesh to obtain powder.

The powder was milled to an average particle size of about 3 to 4 μm in a jet mill by a self-grinding process (that is a dry grinding process) using a high-performance mineral grinding system.

Next, step (S22) of preparing a master batch was performed in the following manner.

The prepared powdery particles were mixed with the synthetic resin polypropylene, and then introduced into an extruder, thereby preparing a pellet-type master batch.

For uniform mixing of the powdery particles with polypropylene, a power mixer was used. A batch mixture of the material powder and the polypropylene resin was introduced into an extruder. The chamber temperature of the extruder was maintained at about 180° C., and the speed of the screw was adjusted such that the diameter of the master batch would be 2.5 mm to 3 mm, whereby the master batch could be stably prepared. When introducing the batch mixture of the powdery particles and the propylene resin, a certain amount of a polypropylene-based dispersing agent was used to prevent agglomeration. In the mixture of the powdery particles and the polypropylene resin, the content of the powdery particles was 25 wt %.

Next, the prepared powdery particle master batch was mixed with polypropylene resin in such a manner that 3.0 parts by weight of the powdery particles were mixed with 100 parts by weight of polypropylene resin. Then, the mixture was introduced into a film forming machine and extruded, thereby making a second film (S23).

Finally, the second film was stretched 1.5-fold in one direction by use of a stretching machine, thereby making a second porous film (S24).

Making of Third Film

Polypropylene resin was introduced into a film forming machine and extruded, thereby making a third film (S3).

Lamination

Next, the first film, the second film and the third film were put one upon another, and then thermally pressed, thereby making a food packaging material (S4). Because the first film, the second film and the third film included the same synthetic resin, they could be strongly bonded to one another by thermal pressing without having to use a separate adhesive layer. Thermal pressing could be performed by putting the films one upon another and then passing the films through heated rolls.

Comparative Example 1

Polypropylene resin was introduced into a film forming machine and extruded, thereby making a packaging material.

Test Example 1

In order to evaluate the freshness maintaining ability of the zipper bag-type packaging material made in Example 1 and Comparative Example 1, cold-stored pork (pork shoulder) was packaged with each packaging material, and then the spoilage rate of the pork was measured at varying time points during storage. The pork used in the test was purchased on the day of start of the test.

Specifically, 200 g of pork was packaged with each zipper bag-type packaging material, and then stored at a temperature of 5±1° C. and a humidity of 40±3%. During storage, the spoilage of the pork was measured at varying time points.

The results of the measurement are shown in Table 1 below.

TABLE 1

| | Sample state | | |
|---|---|---|---|
| | After 7 days | After 14 days | After 21 days |
| Example 1 | Good sample state | Good sample state | 15% loss |
| Comparative Example 1 | Good sample state | 25% loss | 80% loss; changed to green |

As can be seen in Table 1 above, the zipper bag-type packaging material made in Example 1 showed a good sample state even after 2 weeks or more, and the packaging material made in Comparative Example 1 showed a relatively good sample state on day 7, but showed a loss of about 15 to 250. Furthermore, on day 21, in the case of Comparative Example 1, the surface of the pork changed to green due to myoglobin destruction, and a loss of about 80% appeared. Thus, it can be seen that when the packaging material of the present invention is applied, the cold storage stability of pork (pork shoulder) is very excellent.

Test Example 2

In order to evaluate the freshness maintaining ability of the zipper bag-type packaging material made in Example 1 and Comparative Example 1, lettuce was packaged with each packaging material, and then the spoilage of the lettuce was measured at varying time points during storage. The lettuce used in the test was purchased on the day of start of the test.

Specifically, lettuce was packaged with each zipper bag-type packaging material, and then stored at a temperature of 18±2° C. and a humidity of 43±3%. During storage, the spoilage of the lettuce was measured at varying time points.

The results of the measurement are shown in Table 2 below.

TABLE 2

| | Sample state | | |
|---|---|---|---|
| | After 7 days | After 10 days | After 15 days |
| Example 1 | Good sample state | Good sample state | 25% loss |
| Comparative Example 1 | 90% loss | Severely spoiled | Severely spoiled |

As can be seen in Table 2 above, the zipper bag-type packaging material made in Example 1 showed a good sample state up to about day 10. The packaging material of Comparative Example showed a loss of 90% after about 1 week. Thus, it can be seen that when the packaging material of the present invention is applied, the storage stability of food is very excellent.

As described above, the food packaging material according to the present invention has the following effects.

First, because the functional powder is exposed through the pores of the packaging material, the amount of functional powder added can be minimized so that the formability of the packaging material is not adversely affected. Thus, the packaging material can maximize the storage stability of food while the transparency of the packaging material is maintained.

Second, the antioxidant activity of the packaging material can prevent food from being spoiled by oxidation, thereby maximizing the storage stability of the food. The zinc oxide-coated calcium carbonate powder, titanium dioxide-coated boehmite powder and iron-coated hydroxyapatite powder included in the food packaging material according to the present invention have a porous structure with a very large specific area, and easily capture oxygen so as to prevent food in the packaging material from being spoiled by oxidation.

Third, the freshness maintaining effect of the packaging material is achieved by adsorbing ethylene gas. Ethylene gas ($C_2H_4$) that is a gaseous carbon compound is an aging hormone that accelerates maturation of fruits. The food packaging material according to the present invention can adsorb ethylene gas by the porous structure thereof to retard maturation of food and maintain food freshness.

Fourth, the freshness of foods or agricultural products in the packaging material is maintained by the humidity controlling effect of the packaging material. The content of water in packaging materials is changed from the initial content by breathing of fruits and vegetables, and excessive water contents in packaging materials may adversely affect food or agricultural products that are particularly sensitive to water. However, when water is excessively lost from food or agricultural products, the food or agricultural products can be excessively dried. In the packaging material according to the present invention, natural adsorption and release of water on the inner surface of the packaging material occur depending on changes in water contents in the packaging material, and thus natural control of humidity in the packaging material is possible.

Fifth, spoilage of food and agricultural products in the packaging material is retarded by the antibacterial and antifungal effects of the packaging material. Due to the action of the natural materials containing antibacterial components, bacterial growth is inhibited, and due to the action of the natural materials containing antifungal components, fungal growth is also inhibited, and thus spoilage of food and agricultural products in the packaging material is retarded.

Sixth, the packaging material according to the present invention maintains food freshness over an extended period of time by the effect of emitting far-infrared rays. Far-infrared rays emitted from the natural mineral materials of the food packaging material according to the present invention retard decomposition of ascorbic acid (vitamin C) known to prevent the oxidation of cells and tissue by increasing the physiological chemical activity of cells. Through this action, the packaging material retard food rancidity and maintains food freshness.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A food packaging material comprising:
   a first film comprising synthetic resin, calcium carbonate powder coated with zinc oxide, boehmite powder coated with titanium dioxide, and hydroxyapatite powder coated with iron;
   a second film laminated on the first film and comprising powdery particles that contain synthetic resin, loess, elvan, kaolin, zeolite, feldspar, black mica, jade, selenium and charcoal; and
   a third film laminated on the second film and made of synthetic resin,
   wherein the first film has a higher porosity than that of the second film, and the second film has a higher porosity than that of the third film.

2. The food packaging material of claim 1, wherein a sum of amounts of the calcium carbonate powder coated with zinc oxide, the boehmite powder coated with titanium dioxide and the hydroxyapatite powder coated with iron, which are included in the first film, is 0.1 to 1.5 parts by weight based on 100 parts by weight of the synthetic resin, and the powder particles are included in the second film in an amount of 1 to 3 parts by weight based on 100 parts by weight of the synthetic resin.

3. The food packaging material of claim 1, wherein the powder particles contain 8 to 14 wt % of loess, 5 to 9 wt % of elvan, 14 to 18 wt % of kaolin, 20 to 24 wt % of zeolite, 2 to 5 wt % of feldspar, 12 to 16 wt % of black mica, 5 to 9 wt % of jade, 3 to 10 wt % of selenium, and 1 to 5 wt % of charcoal.

4. A method for making a food packaging material, comprising the steps of:
   (a) mixing natural mineral materials, including loess, elvan, kaolin, zeolite, feldspar, black mica, jade and selenium, with charcoal to obtain powdery particles;
   (b) preparing calcium carbonate powder coated with zinc oxide;
   (c) preparing boehmite powder coated with titanium dioxide;
   (d) preparing hydroxyapatite powder coated with iron;
   (e) mixing the powders, obtained in step (b), (c) and (d), with synthetic resin to obtain a first mixture, and introducing the first mixture into a film forming machine, followed by extrusion to obtain a first film;
   (f) stretching the first film to obtain a first porous film;
   (g) mixing the powdery particles, obtained in step (a), with synthetic resin to obtain a second mixture, and introducing the second mixture into a film forming machine, followed by extrusion to obtain a second film;
   (h) stretching the second film to obtain a second porous film having a lower porosity than that of the first porous film;
   (i) introducing synthetic resin into a film forming machine, followed by extrusion to obtain a third film; and
   (j) integrating the first porous film, the second porous film and the third film with one another by thermal pressing.

5. The method of claim 4, wherein step (b) comprises the steps of:
   (b1) adding calcium carbonate powder to distilled water, followed by stirring to obtain a calcium carbonate slurry;
   (b2) dissolving a zinc salt in distilled water to obtain an aqueous solution, and adding the calcium carbonate slurry to the aqueous solution, followed by stirring at a pH of 4.8 to 5.0 and at a temperature of 80 to 95° C. to obtain a first reactant slurry; and
   (b3) filtering and washing the first reactant slurry to obtain a precipitate, drying the precipitate, and heat-treating the dried precipitate at a temperature of 350 to 450° C. for 20 to 40 minutes to obtain calcium carbonate powder particles coated with zinc oxide.

6. The method of claim 4, wherein step (c) comprises the steps of:
   (c1) adding boehmite to distilled water, followed by stirring to obtain a boehmite slurry;
   (c2) dissolving a titanium salt in distilled water to obtain an aqueous solution, and adding the boehmite slurry to the aqueous solution, followed by stirring at a pH of 4.8 to 5.0 and at a temperature of 80 to 95° C. to obtain a second reactant slurry; and
   (c3) filtering and washing the second reactant slurry to obtain a precipitate, drying the precipitate, and heat-treating the dried precipitate at a temperature of 400 to 500° C. for 20 to 40 minutes to obtain boehmite powder particles coated with titanium dioxide.

7. The method of claim 4, wherein step (d) comprises the steps of:
   (d1) adding hydroxyapatite powder to distilled water, followed by stirring to obtain a hydroxyapatite slurry;
   (d2) dissolving an iron salt in distilled water to obtain an aqueous solution, and adding the hydroxyapatite slurry to the aqueous solution, followed by stirring at a pH of 4.8 to 5.0 and at a temperature of 80 to 95° C. to obtain a third reactant slurry; and
   (d3) filtering and washing the third reactant slurry to obtain a precipitate, drying the precipitate, and heat-treating the dried precipitate at a temperature of 450 to 550° C. for 10 to 14 hours to obtain hydroxyapatite powder particles coated with iron.

8. The method of claim 4, wherein a sum of amounts of the calcium carbonate powder coated with zinc oxide, the boehmite powder coated with titanium dioxide and the hydroxyapatite powder coated with iron, which are included in the first film, is 0.1 to 1.5 parts by weight based on 100 parts by weight of the synthetic resin, and the powder particles are included in the second film in an amount of 1 to 3 parts by weight based on 100 parts by weight of the synthetic resin.

9. The method of claim 4, wherein the powder particles contain 8 to 14 wt % of loess, 5 to 9 wt % of elvan, 14 to 18 wt % of kaolin, 20 to 24 wt % of zeolite, 2 to 5 wt % of feldspar, 12 to 16 wt % of black mica, 5 to 9 wt % of jade, 3 to 10 wt % of selenium, and 1 to 5 wt % of charcoal.

* * * * *